US012458729B2

(12) United States Patent
Liu et al.

(10) Patent No.: US 12,458,729 B2
(45) Date of Patent: Nov. 4, 2025

(54) OXIDE LAYER-CONTAINING ZIRCONIUM-NIOBIUM ALLOY TIBIAL PLATEAU PROSTHESIS HAVING BONE TRABECULA AND PREPARATION METHOD

(71) Applicant: Just Medical Devices (Tianjin) Co., Ltd., Tianjin (CN)

(72) Inventors: Lu Liu, Tianjin (CN); Yu Cao, Tianjin (CN); Jianyu Li, Tianjin (CN); Jingkang Zhang, Tianjin (CN); Hongxiu Zhou, Tianjin (CN)

(73) Assignee: Just Medical Devices (Tianjin) Co., Ltd., Tianjin (CN)

(*) Notice: Subject to any disclaimer, the term of this patent is extended or adjusted under 35 U.S.C. 154(b) by 422 days.

(21) Appl. No.: 17/916,708

(22) PCT Filed: Jun. 21, 2021

(86) PCT No.: PCT/CN2021/101287
§ 371 (c)(1),
(2) Date: Oct. 3, 2022

(87) PCT Pub. No.: WO2022/088704
PCT Pub. Date: May 5, 2022

(65) Prior Publication Data
US 2023/0338615 A1    Oct. 26, 2023

(30) Foreign Application Priority Data
Oct. 30, 2020    (CN) .......................... 202011191009.7

(51) Int. Cl.
B22F 3/15    (2006.01)
A61L 27/04    (2006.01)
(Continued)

(52) U.S. Cl.
CPC .......... *A61L 27/306* (2013.01); *A61L 27/047* (2013.01); *A61L 27/56* (2013.01); *B22F 3/15* (2013.01);
(Continued)

(58) Field of Classification Search
CPC .................. A61F 2/3868; A61F 2/389; A61F 2002/2892; A61F 2002/4205;
(Continued)

(56) References Cited

U.S. PATENT DOCUMENTS

2008/0047931 A1* 2/2008 Fesmire .................. A61L 27/04
623/18.11
2016/0305005 A1 10/2016 Walker

FOREIGN PATENT DOCUMENTS

CN    104087729 A    10/2014
CN    109938888 A    6/2019
(Continued)

OTHER PUBLICATIONS

Computer-generated translation of CN 109938888 A (Applicants: Just Huajian Medical Device Tianjin Co Ltd; Inventors: Liu Nian, Shi Wen, Cao Yu, Li Jianyu, Ye Jinduo, Liu Lu; Title: Biological-type knee joint partition bone trabecula tibial plateau), originally published on Jun. 28, 2019. (Year: 2019).*
(Continued)

*Primary Examiner* — Vanessa T. Luk

(57) ABSTRACT

The present disclosure discloses a tibial plateau prosthesis with trabeculae containing zirconium-niobium alloy on oxidation layer and a preparation method thereof. The preparation method uses zirconium niobium alloy powder as raw material, conducting a 3D printing for one-piece molding to obtain an intermediate product of the tibial plateau, performing hot isostatic pressing and cryogenic oxidation to obtain the tibial plateau prosthesis comprising a proximal trabecu-
(Continued)

lar layer and a distal trabecular layer; the pore size and porosity of the proximal trabecular layer are evenly arranged, and the distal trabecular layer are partitioned; the topological structure of the trabeculae of the tibial plateau prosthesis is gradiently distributed from three dimensions; the micro-strain in the 64%-72% region of the finite element model of the tibial plateau bone tissue is between the minimum effective strain threshold and the supraphysiological strain threshold, which increases the mechanical adaptation of the prosthesis.

14 Claims, 19 Drawing Sheets

(51) Int. Cl.
*A61L 27/30* (2006.01)
*A61L 27/56* (2006.01)
*B22F 7/00* (2006.01)
*B22F 10/20* (2021.01)

(52) U.S. Cl.
CPC .............. *B22F 7/002* (2013.01); *B22F 10/20* (2021.01); *A61L 2420/02* (2013.01)

(58) Field of Classification Search
CPC .. A61F 2002/30011; A61F 2002/30028; A61F 2002/30133; A61F 2002/3092; A61F 2002/3093; A61F 2002/30985; A61F 2310/00089; A61F 2310/00095; B22F 3/11; B22F 3/1103; B22F 3/1109; B22F 3/1143; B22F 3/1146; B22F 3/15; B22F 7/002; B22F 7/004

See application file for complete search history.

(56) References Cited

FOREIGN PATENT DOCUMENTS

| CN | 110742711 A | 2/2020 |
|---|---|---|
| CN | 111270196 A | 6/2020 |
| CN | 111826603 A | 10/2020 |
| CN | 112315627 A | 2/2021 |

OTHER PUBLICATIONS

International Search Report of PCT/CN2021/101287, (mail date: Sep. 24, 2021).
Written Opinion of PCT/CN2021/101287, (mail date: Sep. 24, 2021).
Yang, Deyu, Application of Oxinium Knee Prosthesis in Total Knee Arthroplasty, Journal of Clinical Orthopaedics, Aug. 22, 2019.

* cited by examiner

OXIDE LAYER-CONTAINING ZIRCONIUM-NIOBIUM ALLOY TIBIAL PLATEAU PROSTHESIS HAVING BONE TRABECULA AND PREPARATION METHOD

CROSS-REFERENCE TO RELATED APPLICATIONS

This Application is a national stage application of PCT/CN2021/101287. This application claims priorities from PCT Application No. PCT/CN2021/101287, filed Jun. 21, 2021, and from the Chinese patent application 202011191009.7 filed Oct. 30, 2020, the content of which are incorporated herein in the entirety by reference.

TECHNICAL FIELD

The present disclosure relates to the technical field of medical implant, in particular to a tibial plateau prosthesis with trabeculae containing zirconium-niobium alloy on oxidation layer and its preparation method.

BACKGROUND TECHNOLOGY

Total knee arthroplasty is currently an effective clinical treatment for end-stage knee disease. It can relieve the pain of patients, restore their knee function, and improve their quality of life by replacing the injured knee tissue with artificially designed prosthesis. Corresponding to the anatomical structure of human body, the knee prosthesis consists of femoral component, tibial plateau and bearing. With the rapid development of medical device technology and the continuous improvement of the requirements for the safety and effectiveness of prosthesis products, the design and manufacturing technology of knee prosthesis will require continuous optimization and improvement.

At present, the clinically used knee prostheses include cemented and cementless types. Between them, the cemented prosthesis mechanically fix the joint prosthesis and bone tissue through the solidification and filling of bone cement. However, many years of clinical applications have found that bone cement fixation can bring many safety and effectiveness issues, such as, the heat released by the polymerization of cement monomer will cause damage to surrounding tissues; cement particles may enter the bloodstream, or cement may cause high pressure in the medullary cavity during filling, which can lead to pulmonary embolism and fat embolism.

Cementless knee prosthesis can effectively eliminate the safety and effectiveness risks caused by bone cement, which normally uses surface porous structures to promote bone ingrowth and obtain long-term stability. However, the porous structure of the surface is usually made by sandblasting, coating, sintering or other surface treatments, which has low bonding strength with the matrix, easy to fall off, and reduces the service life of the prosthesis. Moreover, these porous structures cannot achieve effective bone ingrowth. Clinical reports have reported that only 2%-40% of the artificial knee joint tibial plateau has bone ingrowth, which cannot form a strong biological fixation.

Patent CN109938888A adopts EBM electron beam melting technology to 3D print the tibial plateau with zonal trabecular structure. In case of the force line of human lower limbs is offset and the horizontal force is uneven, the trabecular partitioned topology in different horizontal directions is designed to make the stress/strain at the tibial plateau/bone interface uniform, so as to achieve uniform bone ingrowth. However, from the axial view of the plateau/bone interface, the trabecular layer is the only transition layer. Stress shielding occurs between the high elastic modulus of prosthesis metal and the low elastic modulus of bone tissue. Furthermore, according to Wolff's Law, only after the stress deforms the bone (also known as micro-strain), can the original signal be started to regulate bone synthesis and catabolism, and the bone ingrowth can only be promoted when the strain range is between the lowest effective strain threshold and the supraphysiological strain threshold. Therefore, it is of great significance to design a knee tibial plateau prosthesis to greatly reduce stress shielding and realize that the micro strain in most areas of bone tissue is between the lowest effective strain threshold and supraphysiological strain threshold, which is conducive to bone integration.

Zirconium-niobium alloy has been gradually used in the field of medical devices for its excellent corrosion resistance, mechanical properties and good biocompatibility. Zirconium-niobium alloy can react with N, C, O or other elements to form a hard oxidation layer on the surface. It has excellent wear resistance and low wear rate, which can reduce the wear of soft materials, that is, it has excellent wear resistance of joint articular surface. Moreover, the ceramic layer can reduce the release of metal ions and has excellent biocompatibility, that is, excellent biocompatibility at the osseointegration interface. The low wear rate of the articular surface is combined organically with the osseointegration interface (trabeculae), which has excellent bone ingrowth performance, enabling the prosthesis to achieve the advantages of both interfaces at the same time. However, there is no report of using zirconium-niobium alloy to prepare tibial plateau prosthesis with trabeculae containing zirconium-niobium alloy on oxidation layer in the prior art.

3D printing technology, as an additive manufacturing technology, breaks through the manufacturing process-oriented product design concepts, and realizes the performance-oriented product design concept, that is, to solve the problem of complex parts that are difficult to form as a whole, and to reduce the waste of raw materials and energy caused by machining and manufacturing. However, the 3D printing products are prone to problems such as uneven microstructure and internal defects, and poor mechanical properties. The failure of powder fusion in part of trabecular structure also results in poor mechanical properties. Therefore, it is of great significance to fabricate a tibial plateau prosthesis with trabeculae containing zirconium-niobium alloy on oxidation layer with excellent mechanical properties and realize the advantages of two interfaces.

SUMMARY OF THE DISCLOSURE

One of the objectives of the present disclosure is to overcome the deficiencies of the existing technology to provide a tibial plateau prosthesis with trabeculae containing zirconium-niobium alloy on oxidation layer.

The second purpose of the present disclosure is to provide a preparation method of the tibial plateau prosthesis with trabeculae containing zirconium-niobium alloy on oxidation layer.

The technical scheme of the present disclosure is summarized as follows:

The preparation method of the tibial plateau prosthesis with trabeculae containing zirconium-niobium alloy on oxidation layer includes the following steps:
1) Using zirconium-niobium alloy powder as the raw material, conducting a 3D printing for one-piece molding, and obtaining a first intermediate of the tibial plateau prosthesis with trabeculae containing zirconium-niobium alloy on oxidation layer, putting the first intermediate into the Sinter-hip furnace, heating to 1250° C.-1400° C. under inert gas protection, placing at a constant pressure of 140 MPa-180 MPa for 1 h to 3 h, reducing to a normal pressure, cooling to below 200° C. with the furnace, taking them out, and obtaining a second intermediate of the tibial plateau prosthesis with trabeculae;

2) Placing the second intermediate product in a programmable thermostat to cool to −80° C. to −120° C. at a rate of 1° C./min, keeping it at a constant temperature for 5 h to 10 h, and taking it out of the programmed thermostat; placing it in a liquid nitrogen for 16 h to 36 h, and adjusting the temperature to a room temperature so as to obtain a third intermediate;

3) Placing the third intermediate product in a programmable thermostat to cool to −80° C. to −120° C. at a rate of 1° C./min, and placing it at a constant temperature for 5 h to 10 h, taking it out of the programmed thermostat, placing them in the liquid nitrogen for 16 h to 36 h and adjusting the temperature to room temperature so as to obtain a fourth intermediate;

4) Machining, finishing, polishing, cleaning, and drying the fourth intermediate product, and obtaining a fifth intermediate, where the upper surface roughness of the fifth intermediate tibial plateau support is Ra≤0.050 μm;

5) Putting the fifth intermediate product into a tube furnace, introducing the normal-pressure inert gas containing 5% to 15% of oxygen in percentage by mass, heating to 500° C. to 700° C. at 5° C./min to 20° C./min, and cooling to 400° C. to 495° C. at 0.4° C./min to 0.9° C./min, and cooling to be below 200° C. sequentially, take it out to obtain the tibial plateau prosthesis with trabeculae containing zirconium-niobium alloy on oxidation layer.

The structure of the tibial plateau prosthesis with trabeculae containing zirconium-niobium alloy on oxidation layer is the same as its first intermediate product, second intermediate product, third intermediate product, fourth intermediate product, and fifth intermediate product.

Further, the inert gas is helium or argon.

The tibial plateau prosthesis with trabeculae containing zirconium-niobium alloy on oxidation layer includes a kidney-shaped plateau support 1, a Y-shaped protrusion 3 is provided on the upper surface of the inwardly curved portion of the kidney-shaped plateau support 1, a rear groove is 5 provided on the lateral surfaces of the two branches of the Y-shaped protrusion 3, a curved protrusion 2 is provided on the upper surface of the outwardly curved portion of the kidney-shaped plateau support 1 corresponding to the Y-shaped protrusion 3; a front groove 6 is arranged on the inner side of the curved curved protrusion 2, the middle part of the lower surface of the kidney-shaped plateau support 1 is provided with a handle 4, and a trabeculae 9 is arranged on the lower surface of the kidney-shaped plateau support 1 excepting connecting the handle 4, the trabeculae 9 is composed of a proximal trabecular layer 21 which is closed to the plateau support 1 and a distal trabecular layer 20 which is away from the plateau support 1; the pore size and porosity of the proximal trabecular layer 21 are evenly arranged, and the distal trabecular layer 20 are partitioned into three partitions; the transverse diameter 10 of the corresponding kidney-shaped plateau support 1 is divided into a first section 25, a second section 26 and a third section 27 by a first marking point 11 and a second marking point 12; and the lengths of the first section, the second section and the third section are 25%-38%, 24%-50% and 25%-38% of the transverse diameter of the kidney-shaped plateau support 1, respectively. A first section line 13 passes through the first marking point 11, a second section line 14 passes through the second marking point 12; and the first section line 13 and the second section line 14 are straight lines or arcs, which separate the distal trabecular layer 20 into an inner portion trabeculae 15, an intermediate portion trabeculae 16 and an outer portion trabeculae 17; the pore size and porosity of the trabeculae in the inner portion 15 are sequentially larger than those in the outer portion 17 and the intermediate portion 16.

The chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 μm.

The specific steps for adjusting the temperature in steps 2) and 3) are: increasing the temperature to −120° C. to −80° C. and keeping the constant temperature for 3 h to 5 h; then increasing the temperature to −40° C. to −20° C. and keeping the constant temperature for 3 h to 5 h; then increasing the temperature to 4° C. to 8° C. and keeping the constant temperature for 1 h to 3 h and then increasing the temperature.

The trabeculae of the proximal trabecular layer 21 has a pore size of 0.36 mm to 0.50 mm, a porosity of 55%-65%, a through-hole ratio of 100%, and a thickness of 0.2 mm-1 mm.

Further, the first section line 13 and the second section line 14 of the distal trabecular layer 20 are straight lines and are arranged in parallel or in splayed arrangement; an included angle 18 between the first section line 13 and the transverse diameter 10 of the corresponding kidney-shaped plateau support 1 is 100° to 60°, an included angle 19 between the second section line 14 and the transverse diameter 10 of the corresponding kidney-shaped plateau support 1 is 80° to 120°.

The pore size of the inner portion trabeculae 15 of the distal trabecular layer 20 ranges from 1.00 mm to 1.10 mm, the porosity ranges from 77.6% to 85%; the pore size of the intermediate portion trabeculae 16 ranges from 0.74 mm to 0.85 mm, the porosity ranges from 70.0% to 74.7%; the pore size of the outer portion trabeculae 17 ranges from 0.86 mm to 0.99 mm, the porosity ranges from 74.8%-77.5%; and a through-hole ratio is 100%, and the thickness of the distal trabecular layer 20 is 0.5 mm to 3 mm.

The handle 4 is selected from one of the followings: a reducing pipe connected with a supporting plate, a reducing pipe with a closed bottom connected with a supporting plate, a cross-shaped stiffened plate or a curved cross-shaped stiffened plate.

The tibial plateau prosthesis with trabeculae containing zirconium-niobium alloy on oxidation layer prepared by the above method.

The present disclosure has the following beneficial effects:

The tibial plateau prosthesis with trabeculae containing zirconium-niobium alloy on oxidation layer in the present disclosure adopts the structure of arranging step distributed bone trabeculae from three dimensions, which can improve the bonding strength between the trabeculae of the tibial plateau and the matrix, and realize the micro-strain in the 64%-72% region of the finite element model of the tibial plateau bone tissue between the minimum effective strain threshold and the suprathreshold strain threshold, increase the mechanical adaptation of the prosthesis, and have excellent bone ingrowth.

Using integral 3D printing technology, the present disclosure solves the problem that traditional machining cannot prepare a complex structure, and has high bonding strength between trabeculae and the matrix, therefore it is not easy to fall off, thereby improving the service life of the prosthesis.

The tibial plateau prosthesis with trabeculae containing zirconium-niobium alloy on oxidation layer has excellent anti-compression performance. And the compressive yield strength of the solid part is enhanced, and the plasticity is enhanced.

The tibial plateau prosthesis with trabeculae containing zirconium-niobium alloy on oxidation layer is integrated to realize the excellent biocompatibility of the osseointegration interface, outstanding bone ingrowth, and a friction interface with super wear resistance and low wear rate.

There is an oxygen-rich layer between the oxidation layer and the matrix of the tibial plateau prosthesis prepared by the present disclosure. The oxygen-rich layer acts as a transition layer, which can improve the adhesion between the oxidation layer and the matrix, and can prevent the oxidation layer from falling off. Moreover, the hardness of the oxidation layer is high.

The tibial plateau prosthesis with trabeculae containing zirconium-niobium alloy on oxidation layer has low artifacts, little interference to nuclear magnetic field, and can be used for nuclear magnetic field detection.

DETAILED DESCRIPTION OF THE EMBODIMENTS

Figure 1:
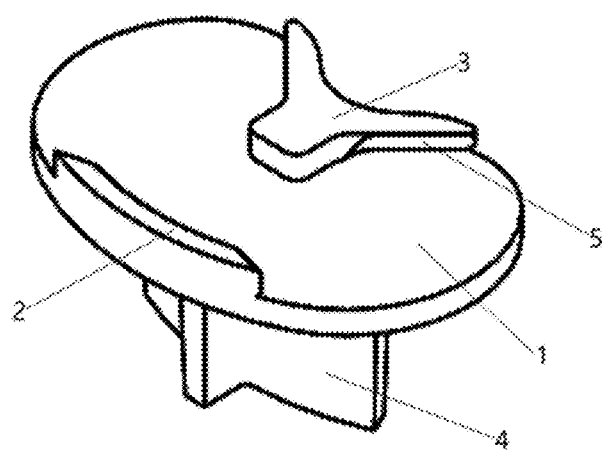
FIG. 1 shows a structural diagram of the tibial plateau prosthesis with trabeculae containing zirconium-niobium alloy on oxidation layer of the present disclosure, wherein the handle is a curved cross-shaped stiffened plate.

The present disclosure will be further described below with the drawings and embodiments.

Embodiment 1

The preparation method of the tibial plateau prosthesis with trabeculae containing zirconium-niobium alloy on oxidation layer includes the following steps:

1) Using zirconium-niobium alloy powder as the raw material, conducting a 3D printing for one-piece molding, and obtaining a first intermediate of the tibial plateau prosthesis with trabeculae containing zirconium-niobium alloy on oxidation layer, putting the first intermediate into the Sinter-hip furnace, heating to 1250° C. under helium gas protection, placing at a constant pressure of 180 MPa for 3 h, reducing to a normal pressure, cooling to below 200° C. with the furnace, taking them out, and obtaining a second intermediate of the tibial plateau prosthesis with trabeculae;

2) Placing the second intermediate product in a programmable thermostat to cool to −80° C. at a rate of 1° C./min, keeping it at a constant temperature for 10 h, and taking it out of the programmed thermostat; placing it in a liquid nitrogen for 16 h, and adjusting the temperature to a room temperature so as to obtain a third intermediate;

3) Placing the third intermediate product in a programmable thermostat to cool to −80° c at a rate of 1° C./min, and placing it at a constant temperature for 10 h, taking it out of the programmed thermostat, placing them in the liquid nitrogen for 16 h and adjusting the temperature to room temperature so as to obtain a fourth intermediate;

The specific steps for adjusting the temperature in steps 2) and 3) are: increasing the temperature to −120° C. and keeping the constant temperature for 5 h; then increasing the temperature to −40° C. and keeping the constant temperature for 5 h; then increasing the temperature to 4° C. and keeping the constant temperature for 3 h and then increasing the temperature;

4) Machining, finishing, polishing, cleaning, and drying the fourth intermediate product, and obtaining a fifth intermediate, where the upper surface roughness of the fifth intermediate tibial plateau support is Ra=0.012 μm;

5) Putting the fifth intermediate product into a tube furnace, introducing the normal-pressure helium gas containing 5% of oxygen in percentage by mass, heating to 500° c at 5° C./min, and cooling to 400° c at 0.4° C./min, and cooling to be below 200° C. sequentially, take it out to obtain the tibial plateau prosthesis with trabeculae containing zirconium-niobium alloy on oxidation layer.

The structure of the tibial plateau prosthesis with trabeculae containing zirconium-niobium alloy on oxidation layer is the same as its first intermediate product, second intermediate product, third intermediate product, fourth intermediate product, and fifth intermediate product.

The chemical composition of the zirconium-niobium alloy powder in percentage by mass is respectively 85.6% of Zr, 12.5% of Nb, and the rest are unavoidable impurities; where a particle size of the zirconium-niobium alloy powder ranges from 45 to 150 μm and was purchased from Xi'an Sailong Metal Materials Co., Ltd.

Figure 2:
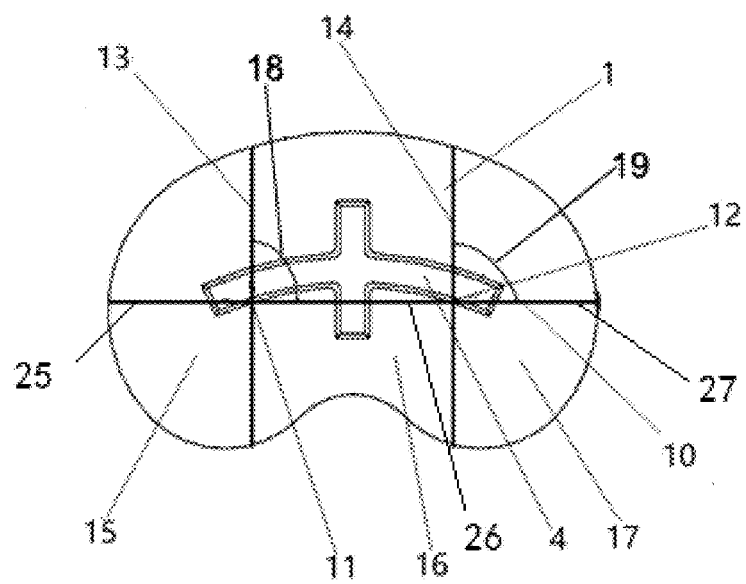
FIG. 2 shows schematic diagram of the trabeculae on the lower surface of the tibial plateau prosthesis of the present disclosure.
Figure 7:
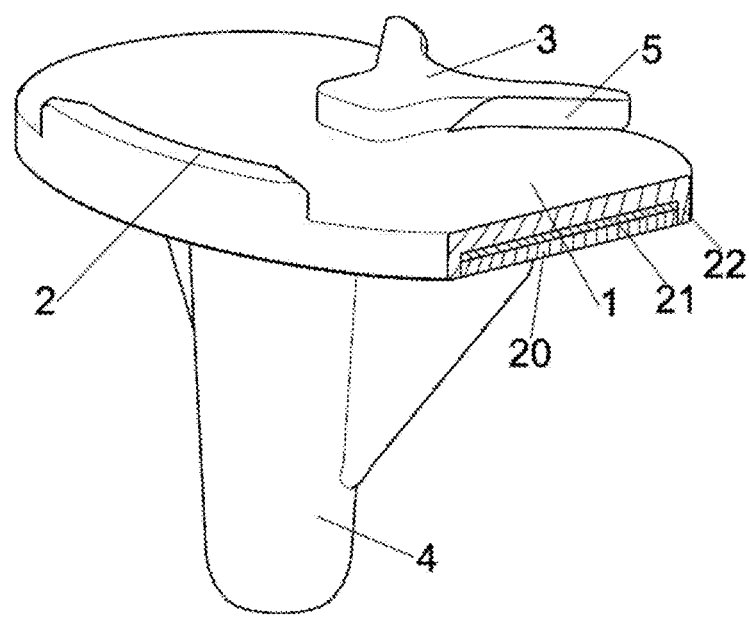
FIG. 7 shows an axonometric drawing of the tibial plateau prosthesis of the present disclosure, wherein the handle is the reducing pipe with a closed bottom, the kidney-shaped plateau support and the trabeculae show a partial sectional view.
Figure 8:
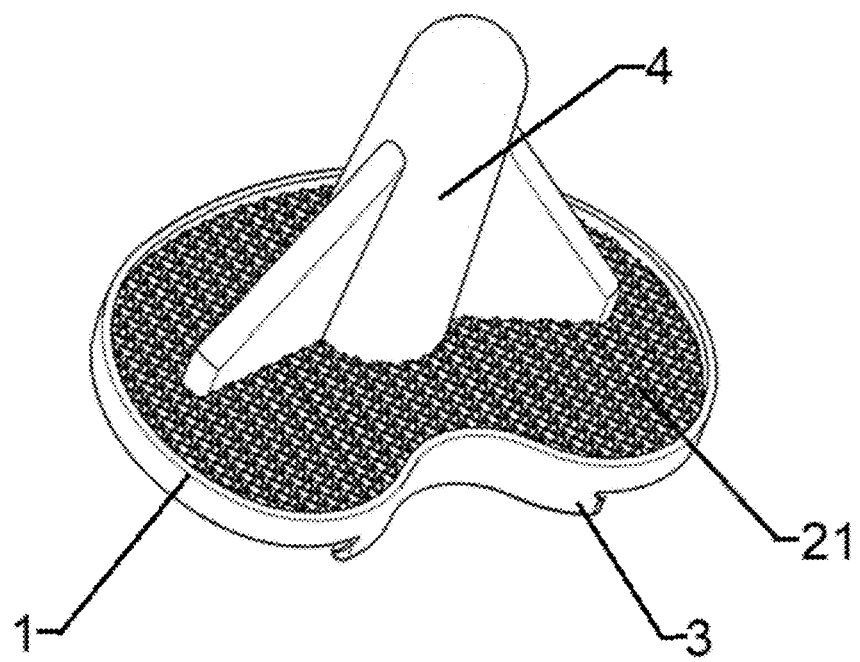
FIG. 8 shows an axonometric drawing of the tibial plateau prosthesis of the present disclosure, wherein the handle is the reducing pipe with a closed bottom connected with a supporting plate, the distal trabecular layer does not included.

As shown in FIG. 1, the tibial plateau prosthesis with trabeculae containing zirconium-niobium alloy on oxidation layer includes a kidney-shaped plateau support 1, a Y-shaped protrusion 3 is provided on the upper surface of the inwardly curved portion of the kidney-shaped plateau support 1, a rear groove is 5 provided on the lateral surfaces of the two branches of the Y-shaped protrusion 3, a curved protrusion 2 is provided on the upper surface of the outwardly curved portion of the kidney-shaped plateau support 1 corresponding to the Y-shaped protrusion 3; a front groove 6 is arranged on the inner side of the curve protrusion 2, the middle part of the lower surface of the kidney-shaped plateau support 1 is provided with a handle 4, and a trabeculae 9 is arranged on the lower surface of the kidney-shaped plateau support 1 excepting connecting the handle 4. As shown in FIG. 7, the trabeculae 9 is composed of a proximal trabecular layer 21 which is closed to the plateau support 1 and a distal trabecular layer 20 which is away from the plateau support 1; the pore size and porosity of the proximal trabecular layer 21 are evenly arranged as shown in FIG. 8, and the distal trabecular layer 20 are partitioned into three partitions; the transverse diameter 10 of the corresponding kidney-shaped plateau support 1 is divided into a first section 25, a second section 26 and a third section 27 by a first marking point 11 and a second marking point 12; and the lengths of the first section, the second section and the third section are 30%: 40%: 30% of the transverse diameter of the kidney-shaped plateau support 1, respectively. A first section line 13 passes through the first marking point 11, a second section line 14 passes through the second marking point 12; and the first section line 13 and the second section line 14 are straight lines or arcs, which separate the distal trabecular layer 20 into an inner portion trabeculae 15, an intermediate portion trabeculae 16 and an outer portion trabeculae 17, as shown in FIG. 2.

The trabeculae of the proximal trabecular layer 21 has a pore size of 0.43 mm, a porosity of 60%, a through-hole ratio of 100%, and a thickness of 0.6 mm.

Figure 3:
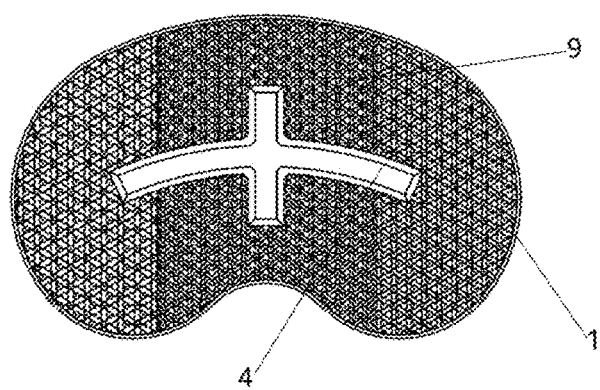
FIG. 3 shows a structural diagram of the tibial plateau prosthesis of the present disclosure, wherein the handle is a curved cross stiffened plate.

The first section line 13 and the second section line 14 of the distal trabecular layer 20 are straight lines and are arranged in parallel; an included angle 18 between the first section line 13 and the transverse diameter 10 of the corresponding kidney-shaped plateau support 1 is 90° (as shown in FIG. 3), an included angle 19 between the second section line 14 and the transverse diameter 10 of the corresponding kidney-shaped plateau support 1 is 90°.

The pore size of the inner portion trabeculae 15 of the distal trabecular layer 20 is 1.05 mm, the porosity is 80%, and a through-hole ratio of 100%; the pore size of the intermediate portion trabeculae 16 is 0.80 mm, the porosity is 72%, and a through-hole ratio of 100%; the pore size of the outer portion trabeculae 17 is 0.90 mm, the porosity is 75%, and the through-hole ratio is 100%, and the thickness of the distal trabecular layer 20 is 2 mm.

Figure 10:
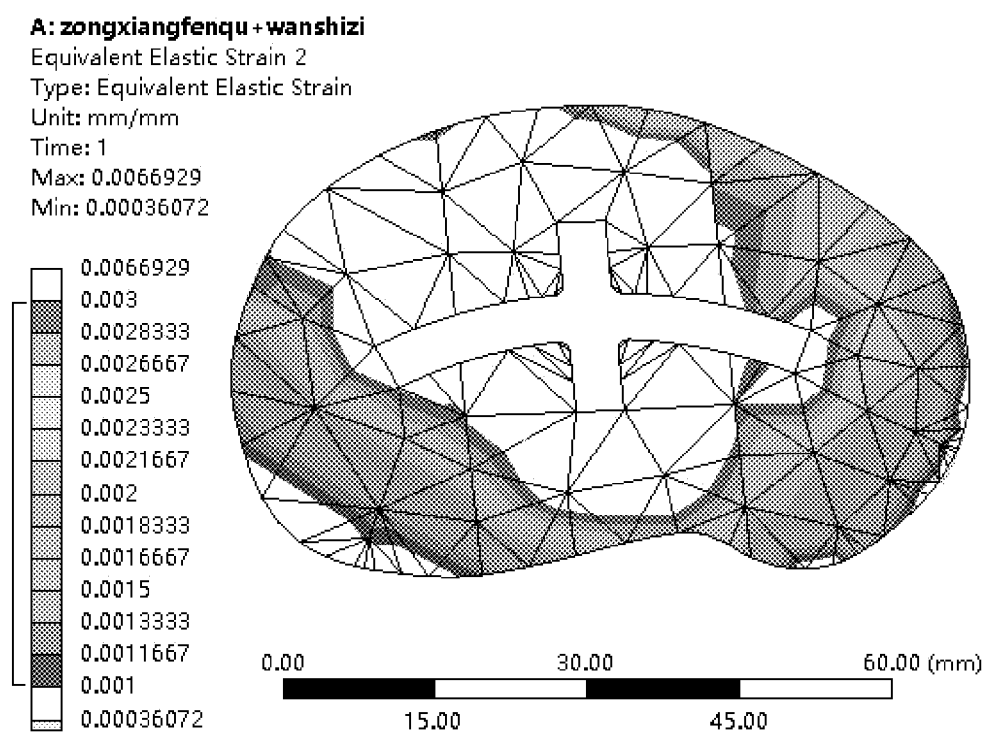
FIG. 10 is the fretting cloud chart of the tibial plateau prosthesis of the embodiment 1, wherein the first section line 13 and the second section line 14 are straight lines and are arranged in parallel arrangement, and included angles 18,19 between the first section line 13/second section line 14 and the transverse diameter 10 are 90°.

As shown in FIG. 3, the handle 4 is a curved cross-shaped stiffened plate. FIG. 10 shows the fretting cloud chart of the tibial plateau prosthesis of the embodiment 1. A side wall 22 can be arranged at the edge of the lower surface of the kidney-shaped plateau support 1, so that the trabeculae is arranged within the side wall 22, as shown in FIG. 7.

Embodiment 2

The preparation method of the tibial plateau prosthesis with trabeculae containing zirconium-niobium alloy on oxidation layer includes the following steps:

1) Using zirconium-niobium alloy powder as the raw material, conducting a 3D printing for one-piece molding, and obtaining a first intermediate of the tibial plateau prosthesis with trabeculae containing zirconium-niobium alloy on oxidation layer, putting the first intermediate into the Sinter-hip furnace, heating to 1325° C. under helium gas protection, placing at a constant pressure of 160 MPa for 2 h, reducing to a normal pressure, cooling to below 200° C. with the furnace, taking them out, and obtaining a second intermediate of the tibial plateau prosthesis with trabeculae;

2) Placing the second intermediate product in a programmable thermostat to cool to −100° cat a rate of 1° C./min, keeping it at a constant temperature for 7 h, and taking it out of the programmed thermostat; placing it in a liquid nitrogen for 24 h, and adjusting the temperature to a room temperature so as to obtain a third intermediate;

3) Placing the third intermediate product in a programmable thermostat to cool to −100° cat a rate of 1° C./min, and placing it at a constant temperature for 7 h, taking it out of the programmed thermostat, placing them in the liquid nitrogen for 24 h and adjusting the temperature to room temperature so as to obtain a fourth intermediate;

The specific steps for adjusting the temperature in steps 2) and 3) are: increasing the temperature to −100° C. and keeping the constant temperature for 4 h; then increasing the temperature to −30° C. and keeping the constant temperature for 4 h; then increasing the temperature to 6° C. and keeping the constant temperature for 2 h and then increasing the temperature;

4) Machining, finishing, polishing, cleaning, and drying the fourth intermediate product, and obtaining a fifth intermediate, where the upper surface roughness of the fifth intermediate tibial plateau support is Ra=0.035 μm;

5) Putting the fifth intermediate product into a tube furnace, introducing the normal-pressure helium gas containing 10% of oxygen in percentage by mass, heating to 600° C. at 15° C./min, and cooling to 450° cat 0.7° C./min, and cooling to be below 200° C. sequentially, take it out to obtain the tibial plateau prosthesis with trabeculae containing zirconium-niobium alloy on oxidation layer.

The structure of the tibial plateau prosthesis with trabeculae containing zirconium-niobium alloy on oxidation layer is the same as its first intermediate product, second intermediate product, third intermediate product, fourth intermediate product, and fifth intermediate product.

The chemical composition of the zirconium-niobium alloy powder in percentage by mass is respectively 93.4% of Zr, 5.1% of Nb, and the rest are unavoidable impurities; where a particle size of the zirconium-niobium alloy powder ranges from 45 to 150 μm and was purchased from Xi'an Sailong Metal Materials Co., Ltd.

Figure 9:
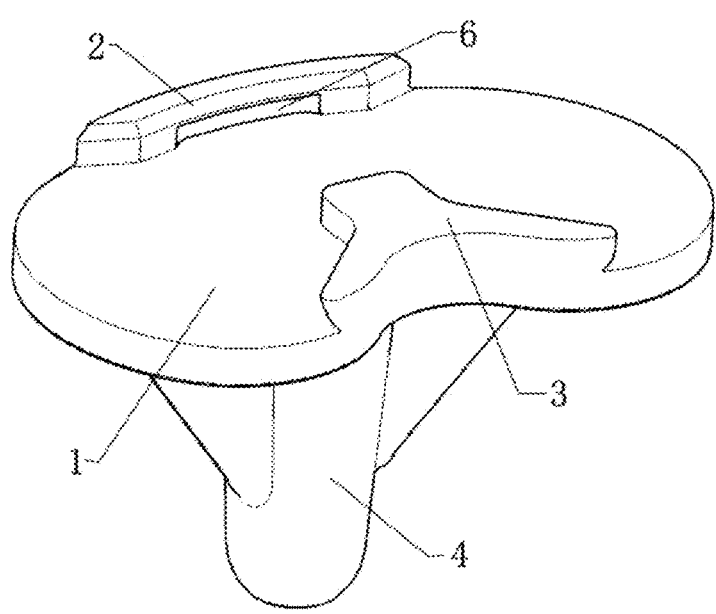
FIG. 9 shows an axonometric drawing of the tibial plateau prosthesis of the present disclosure, wherein the handle is the reducing pipe connected with a supporting plate.

As shown in FIG. 9, the tibial plateau prosthesis with trabeculae containing zirconium-niobium alloy on oxidation layer includes a kidney-shaped plateau support 1, a Y-shaped protrusion 3 is provided on the upper surface of the inwardly curved portion of the kidney-shaped plateau support 1, a rear groove is 5 provided on the lateral surfaces of the two branches of the Y-shaped protrusion 3, a curved protrusion 2 is provided on the upper surface of the outwardly curved portion of the kidney-shaped plateau support 1 corresponding to the Y-shaped protrusion 3; a front groove 6 is arranged on the inner side of the curved curved protrusion 2, the middle part of the lower surface of the kidney-shaped plateau support 1 is provided with a handle 4, and a trabeculae 9 is arranged on the lower surface of the kidney-shaped plateau support 1 excepting connecting the handle 4. The trabeculae 9 is composed of a proximal trabecular layer 21 which is closed to the plateau support 1 and a distal trabecular layer 20 which is away from the plateau support 1; the pore size and porosity of the proximal trabecular layer 21 are evenly arranged, and the distal trabecular layer 20 are partitioned into three partitions; the transverse diameter 10 of the corresponding kidney-shaped plateau support 1 is divided into a first section 25, a second section 26 and a third section 27 by a first marking point 11 and a second marking point 12; and the lengths of the first section, the second section and the third section are 38%: 24%: 38% of the transverse diameter of the kidney-shaped plateau support 1. A first section line 13 passes through the first marking point 11, a second section line 14 passes through the second marking point 12; and the first section line 13 and the second section line 14 are straight lines, which separate the distal trabecular layer 20 into an inner portion trabeculae 15, an intermediate portion trabeculae 16 and an outer portion trabeculae 17.

The trabeculae of the proximal trabecular layer 21 has a pore size of 0.50 mm, a porosity of 65%, a through-hole ratio of 100%, and a thickness of 1 mm.

Figure 5:
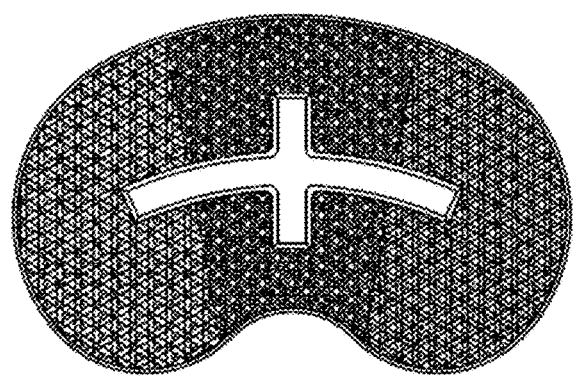
FIG. 5 is a bottom view of the tibial plateau prosthesis of the present disclosure, wherein the first section line 13 and the second section line 14 are straight lines and are arranged in splayed arrangement.

The first section line 13 and the second section line 14 of the distal trabecular layer 20 are straight lines and are arranged in splayed arrangement; an included angle 18 between the first section line 13 and the transverse diameter 10 of the corresponding kidney-shaped plateau support 1 is 100°, an included angle 19 between the second section line 14 and the transverse diameter 10 of the corresponding kidney-shaped plateau support 1 is 80° (the distal trabecular layer 20 excepting the handle was shown in FIG. 5).

The pore size of the inner portion trabeculae 15 of the distal trabecular layer 20 is 1.10 mm, the porosity is 85%, and a through-hole ratio of 100%; the pore size of the intermediate portion trabeculae 16 is 0.85 mm, the porosity is 74.7%, and a through-hole ratio of 100%; the pore size of the outer portion trabeculae 17 is 0.99 mm, the porosity is 77.5%, and the through-hole ratio is 100%, and the thickness of the distal trabecular layer 20 is 0.5 mm.

Figure 6:
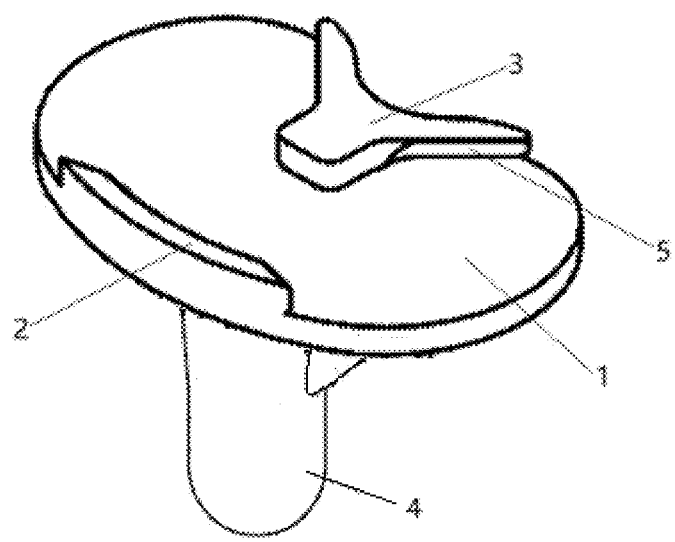
FIG. 6 shows an axonometric drawing of the tibial plateau prosthesis of the present disclosure, wherein the handle is the reducing pipe with a closed bottom.

As shown in FIG. 6, the handle 4 is a reducing pipe with a closed bottom connected with a supporting plate.

Figure 11:
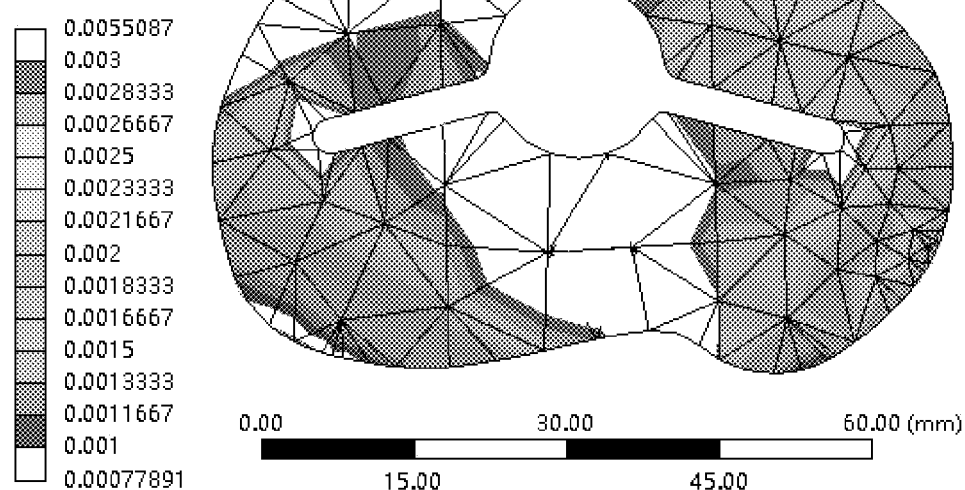
FIG. 11 is the fretting cloud chart of the tibial plateau prosthesis of the embodiment 2, wherein the first section line 13 and the second section line 14 are straight lines and are arranged in splayed arrangement, and the handle is the reducing pipe with a closed bottom connected with a supporting plate.

FIG. 11 shows the fretting cloud chart of the tibial plateau prosthesis of the embodiment 2.

Embodiment 3

The preparation method of the tibial plateau prosthesis with trabeculae containing zirconium-niobium alloy on oxidation layer includes the following steps:

1) Using zirconium-niobium alloy powder as the raw material, conducting a 3D printing for one-piece molding, and obtaining a first intermediate of the tibial plateau prosthesis with trabeculae containing zirconium-niobium alloy on oxidation layer, putting the first intermediate into the Sinter-hip furnace, heating to 1400° C. under argon gas protection, placing at a constant pressure of 140 MPa for 1 h, reducing to a normal pressure, cooling to below 200° C. with the furnace, taking them out, and obtaining a second intermediate of the tibial plateau prosthesis with trabeculae;

2) Placing the second intermediate product in a programmable thermostat to cool to −120° cat a rate of 1° C./min, keeping it at a constant temperature for 5 h, and taking it out of the programmed thermostat; placing it in a liquid nitrogen for 36 h, and adjusting the temperature to a room temperature so as to obtain a third intermediate;

3) Placing the third intermediate product in a programmable thermostat to cool to −120° C. at a rate of 1° C./min, and placing it at a constant temperature for 5 h, taking it out of the programmed thermostat, placing them in the liquid nitrogen for 36 h and adjusting the temperature to room temperature so as to obtain a fourth intermediate;

The specific steps for adjusting the temperature in steps 2) and 3) are: increasing the temperature to −80° C. and keeping the constant temperature for 3 h; then increasing the temperature to −20° C. and keeping the constant temperature for 3 h; then increasing the temperature to 8° C. and keeping the constant temperature for 1 h and then increasing the temperature;

4) Machining, finishing, polishing, cleaning, and drying the fourth intermediate product, and obtaining a fifth intermediate, where the upper surface roughness of the fifth intermediate tibial plateau support is Ra=0.050 μm;

5) Putting the fifth intermediate product into a tube furnace, introducing the normal-pressure argon gas containing 15% of oxygen in percentage by mass, heating to 700° cat 20° C./min, and cooling to 495° C. at 0.9° C./min, and cooling to be below 200° C. sequentially, take it out to obtain the tibial plateau prosthesis with trabeculae containing zirconium-niobium alloy on oxidation layer.

The structure of the tibial plateau prosthesis with trabeculae containing zirconium-niobium alloy on oxidation layer is the same as its first intermediate product, second intermediate product, third intermediate product, fourth intermediate product, and fifth intermediate product.

The chemical composition of the zirconium-niobium alloy powder in percentage by mass is respectively 96.5% of Zr, 1% of Nb, and the rest are unavoidable impurities; where a particle size of the zirconium-niobium alloy powder ranges from 45 to 150 μm and was purchased from Xi'an Sailong Metal Materials Co., Ltd.

Figure 4:
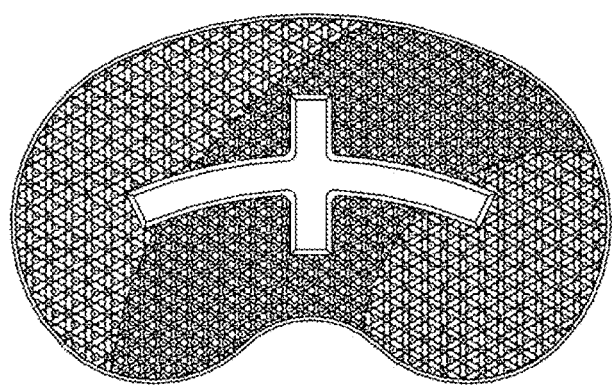
FIG. 4 is a bottom view of the tibial plateau prosthesis of the present disclosure, wherein the first section line 13 and the second section line 14 are arcs.

The tibial plateau prosthesis with trabeculae containing zirconium-niobium alloy on oxidation layer includes a kidney-shaped plateau support 1, a Y-shaped protrusion 3 is provided on the upper surface of the inwardly curved portion of the kidney-shaped plateau support 1, a rear groove is 5 provided on the lateral surfaces of the two branches of the Y-shaped protrusion 3, a curved protrusion 2 is provided on the upper surface of the outwardly curved portion of the kidney-shaped plateau support 1 corresponding to the Y-shaped protrusion 3; a front groove 6 is arranged on the inner side of the curved protrusion 2, the middle part of the lower surface of the kidney-shaped plateau support 1 is provided with a handle 4, and a trabeculae 9 is arranged on the lower surface of the kidney-shaped plateau support 1 excepting connecting the handle 4. The trabeculae 9 is composed of a proximal trabecular layer 21 which is closed to the plateau support 1 and a distal trabecular layer 20 which is away from the plateau support 1; the pore size and porosity of the proximal trabecular layer 21 are evenly arranged, and the distal trabecular layer 20 are partitioned into three partitions; the transverse diameter 10 of the corresponding kidney-shaped plateau support 1 is divided into a first section 25, a second section 26 and a third section 27 by a first marking point 11 and a second marking point 12; and the lengths of the first section, the second section and the third section are 25%: 50%: 25% of the transverse diameter of the kidney-shaped plateau support 1. A first section line 13 passes through the first marking point 11, a second section line 14 passes through the second marking point 12; as shown in FIG. 4, the first section line 13 and the second section line 14 are arcs, which separate the distal trabecular layer 20 into an inner portion trabeculae 15, an intermediate portion trabeculae 16 and an outer portion trabeculae 17.

The trabeculae of the proximal trabecular layer 21 has a pore size of 0.36 mm, a porosity of 55%, a through-hole ratio of 100%, and a thickness of 0.2 mm.

The pore size of the inner portion trabeculae 15 of the distal trabecular layer 20 is 1.00 mm, the porosity is 77.6%, and a through-hole ratio of 100%; the pore size of the intermediate portion trabeculae 16 is 0.74 mm, the porosity is 70.0%, and a through-hole ratio of 100%; the pore size of the outer portion trabeculae 17 is 0.86 mm, the porosity is 74.8%, and the through-hole ratio is 100%, and the thickness of the distal trabecular layer 20 is 3 mm.

The handle 4 is a reducing pipe with a closed bottom connected with a supporting plate.

Figure 12:
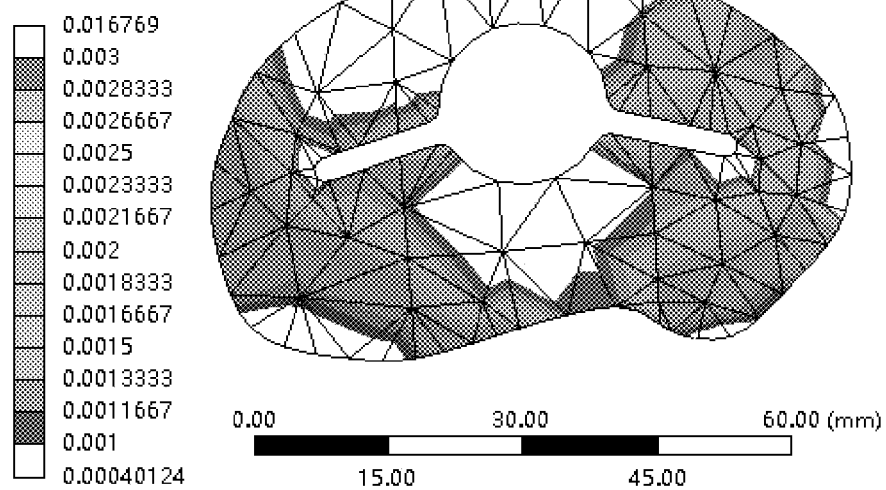
FIG. 12 is the fretting cloud chart of the tibial plateau prosthesis of the embodiment 3, wherein the first section line 13 and the second section line 14 are arcs, and the handle is the reducing pipe with a closed bottom connected with a supporting plate.

FIG. 12 shows the fretting cloud chart of the tibial plateau prosthesis of the embodiment 3.

A side wall 22 can be arranged at the edge of the lower surface of the kidney-shaped plateau support 1, so that the trabeculae is arranged within the side wall 22.

Control Group 1

Using zirconium-niobium alloy powder as the raw material, conducting a 3D printing for one-piece molding, and obtaining a tibial plateau prosthesis with trabeculae containing zirconium-niobium alloy on oxidation layer which structure is same as that of the Embodiment 1.

Experiment Verification

The finite element models of Embodiments 1, 2 and 3 were analyzed by finite element method, the obtained fretting cloud charts only show the compressive strain values are in the range of 1000-3000 microstrains (shaded areas), and the 1000-3000 micro-strains areas accounts for 65.6%, 64.4% and 68.1% of the entire tibial plateau bone tissue finite element model respectively (in FIGS. 10, 11, 12). It is suggested that the micro-strains in most area of the bone tissue of the tibial plateau prosthesis of the present disclosure is between the minimum effective strain threshold and the supraphysiological strain threshold, which is beneficial to the bone ingrowth performance.

Figure 13:
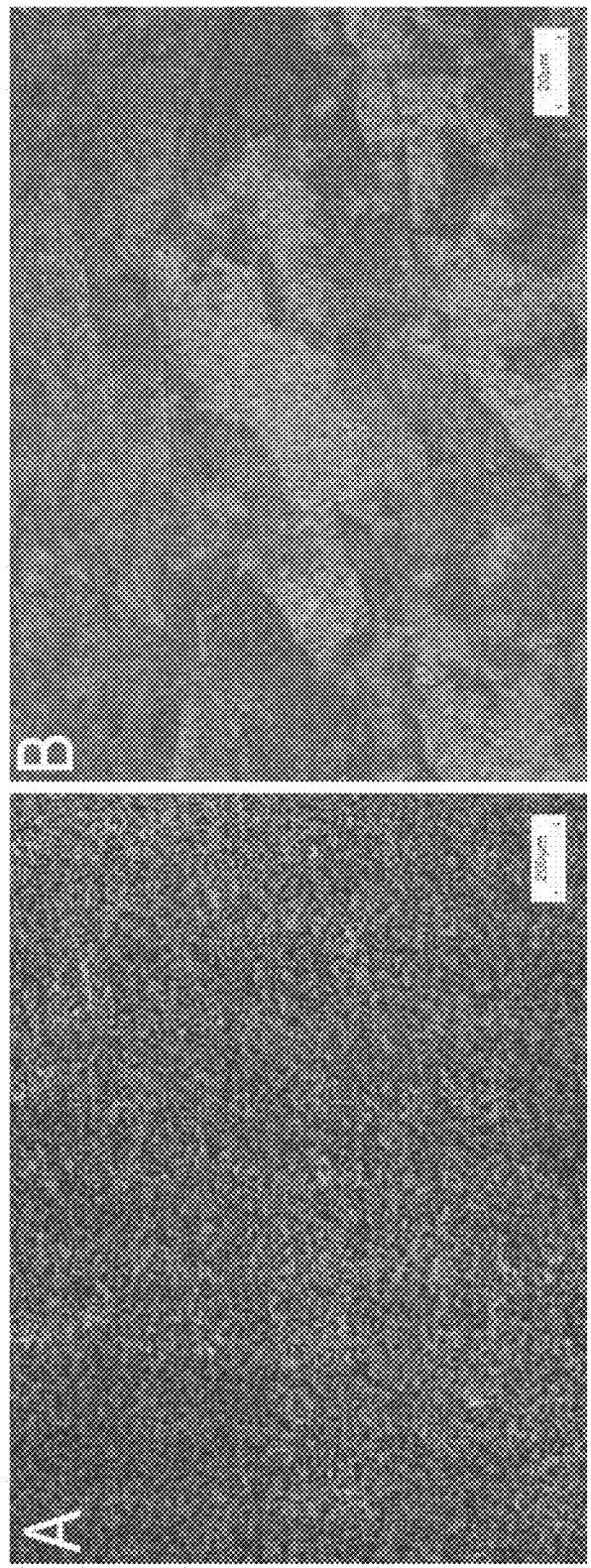
FIG. 13 shows the metallographic micro structure of the solid part in Control Group 2, wherein A is observed by 50 times magnification; B is observed by 500 times magnification.
Figure 14:
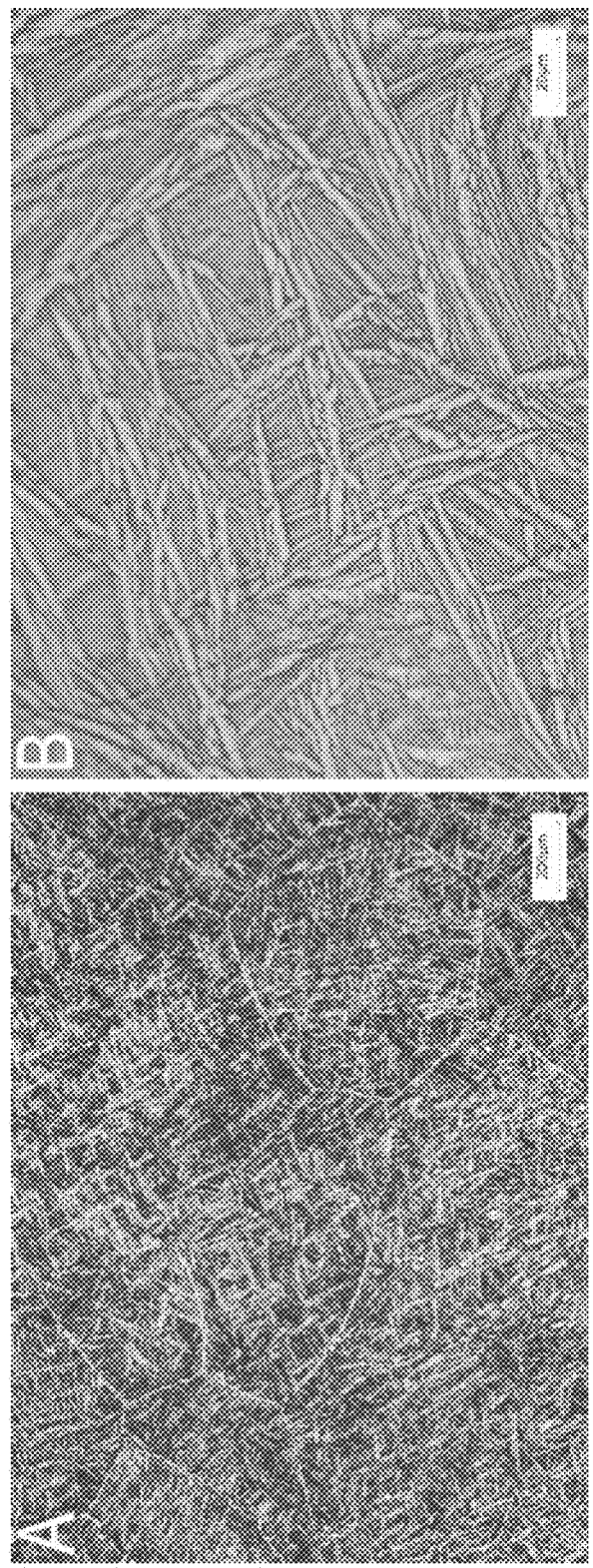
FIG. 14 shows the metallographic microscopic structure of the solid part in Embodiment 1 that has not prepared with step 4) and step 5) in the preparation method, wherein A is observed by 50 times magnification; B is observed by 500 times magnification.

A solid part in the control group 1 and a solid part of the embodiment 1 that has not been prepared with step 4) and 5) were observed and analyzed by an inverted scanning electron microscope (Axio Vert.A1, Zeiss, Germany). The results were shown in FIGS. 13-14. In the metallographic photos of the Control Group 1, small a martensite can be observed. The structure is small, easy for stress concentration, and the plasticity is poor. In the metallograph of Embodiment 1, α phase can be observed, basket net structure, grain refinement. The results indicated that the solid part (without oxidation layer) of the tibial plateau prosthesis prepared by the present disclosure has excellent strength and plasticity.

Figure 15:
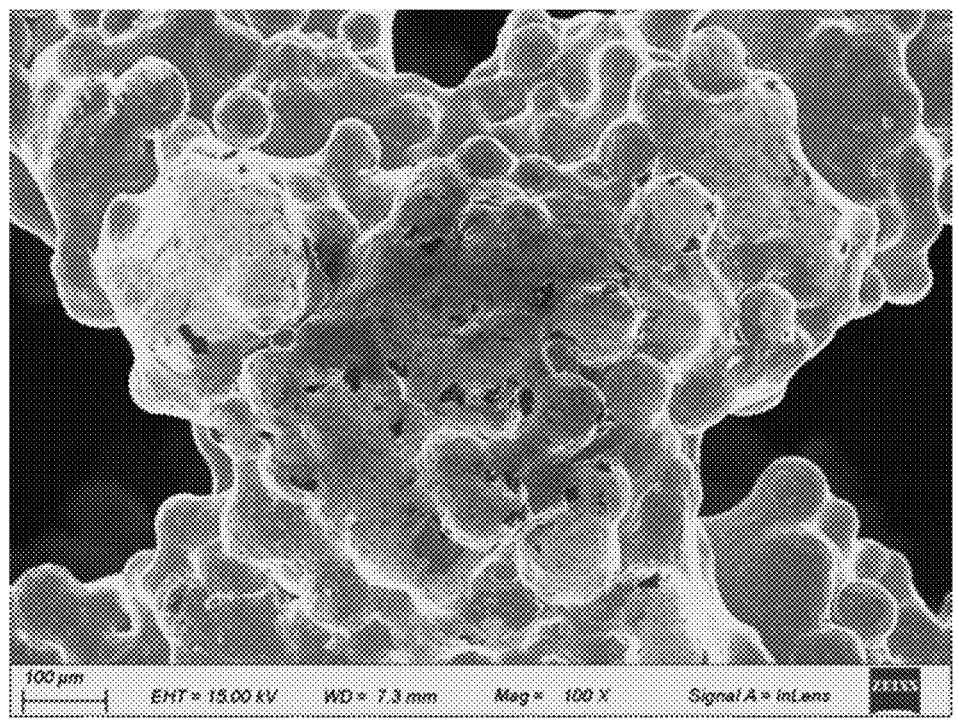
FIG. 15 shows SEM images of the trabeculae in Control Group 1.
Figure 16:
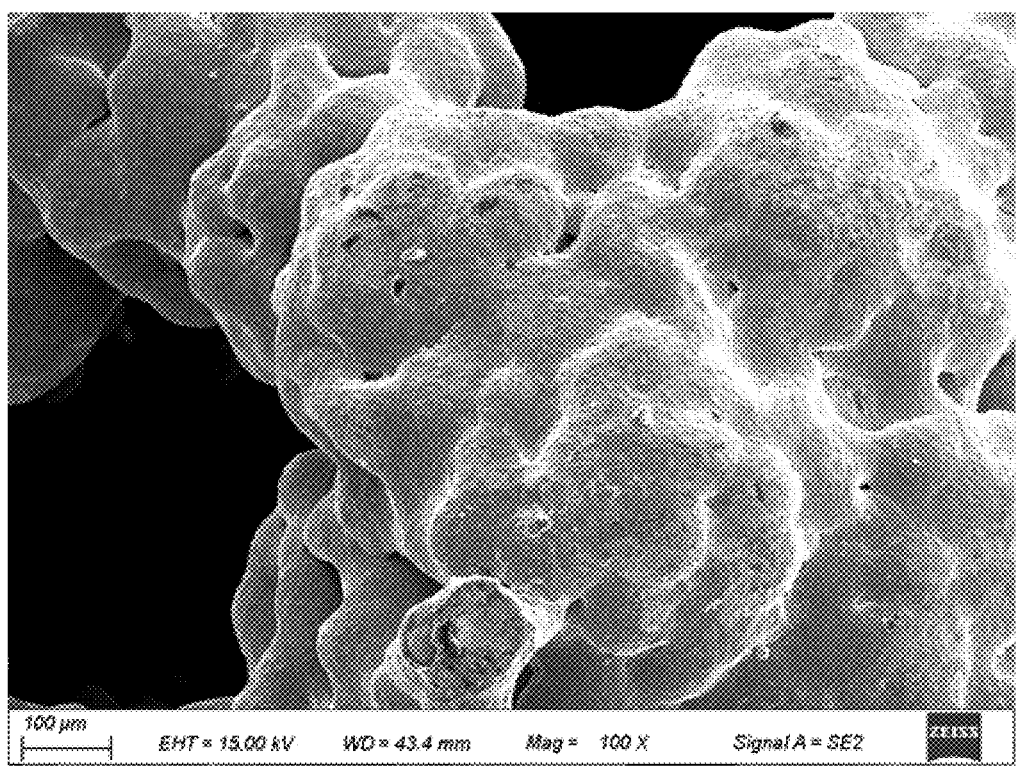
FIG. 16 shows SEM images of the trabeculae in Embodiment 1 that has not been prepared with steps 4) and 5) of the preparation method.

As shown in FIGS. 15-16, the trabecular part of the control group 1 and the trabecular part of the embodiment 1 that has not been prepared with step 4) and 5) were observed and analyzed by scanning electron microscopy (Crossbeam340/550, Zeiss, Germany). Compared with the control group 1, the zirconium-niobium alloy powder of the trabecular part of the embodiment 1 was further sintered, suggesting that the overall performance of the bone trabeculae was improved.

A physical compression test piece (size: 8*8*10 mm$^3$) that has not been prepared with step 4) and 5) in the preparation method in the embodiment 1 and a physical compression test piece (size: 8*8*10 mm$^3$) in the control group 1 were subjected to a compression performance test by an electronic universal testing machine (UTM5105, Shenzhen SUNS Technology Co., Ltd., and China). There were 5 physical compression test pieces respectively in the embodiment 1 and the control group 1. Results were shown in Table 1. The compressive yield strength of embodiment 1 is 546.72 MPa, better than that of Control Group 1 ($P<0.05$), suggesting that the solid part prepared by the present disclosure has excellent anti-compression performance.

TABLE 1

Anti-compression experiment results of the solid specimens of Control Group 1 and Embodiment 1 ($\bar{x} \pm s$, n = 5, *P < 0.05, compared with Control Group 1)

| Group | Cross-sectional Area (mm$^2$) | Yield Load (kN) | Yield Strength (MPa) |
| --- | --- | --- | --- |
| Embodiment 1 | 64 | 34.99 ± 4.04* | 546.72 ± 63.19* |
| Control Group 1 | 64 | 23.59 ± 2.30 | 368.63 ± 35.92 |

A bone trabeculae compression specimens of the Control Group 1 and the bone trabeculae compression specimens with pore size of 0.80 mm, porosity of 72% and through-hole rage of 100% of the of Embodiment 1 (specimen size: 8*8*10 mm$^3$) that has not been prepared with step 4) and step 5) of the above-mentioned preparation method, were subjected to a compression test by the electronic universal testing machine (UTM5105, Shenzhen SUNS Technology Co., Ltd., and China). Bone trabeculae compression specimens of the Control Group 1 and the Embodiment 1 were 5 pieces each. The results are shown in Table 2. The compressive yield strength of Embodiment 1 is 18.39 MPa, significantly better than that of Control Group 1 (P<0.05), suggesting that the bone trabecular part of the tibial plateau prosthesis prepared by the present disclosure has excellent anti-compression performance.

TABLE 2

Anti-compression experiment results of the bone trabecular specimens of Control Group 1 and Embodiment 1 ($\bar{x} \pm s$, n = 5, *P < 0.05, compared with Control Group 1)

| Group | Cross-sectional Area (mm$^2$) | Yield Load (kN) | Yield Strength (MPa) |
| --- | --- | --- | --- |
| Embodiment 1 | 64 | 1177.24 ± 91.66* | 18.39 ± 1.43* |
| Control Group 1 | 64 | 926.12 ± 106.13 | 14.47 ± 1.66 |

Figure 17:
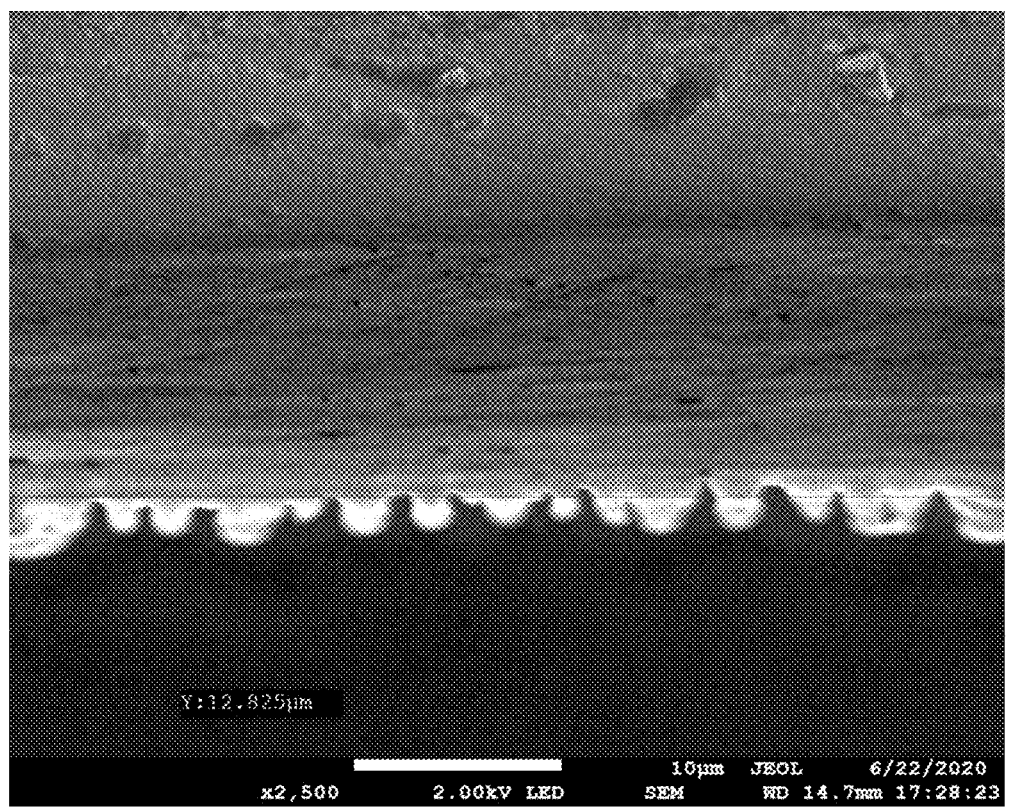
FIG. 17 shows the SEM of cross-section between the oxidation layer and the matrix in Embodiment 1.

The cross-section of the matrix and oxidation layer of the zirconium-niobium alloy of Embodiment 1 was observed by scanning electron microscopy (Crossbeam340/550, Zeiss, Germany) (see FIG. 17). The cross sections of the matrix and oxidation layer of the zirconium-niobium alloy in Embodiments 2 and 3 were observed. The oxidation layer thickness were 10.3 μm, 17.2 μm and 20.6 μm, respectively. There was an oxygen-rich layer between the oxidation layer and the matrix of the zirconium-niobium alloy to enhance the bonding force between the matrix and oxidation layer of zirconium-niobium alloy.

Figure 18:
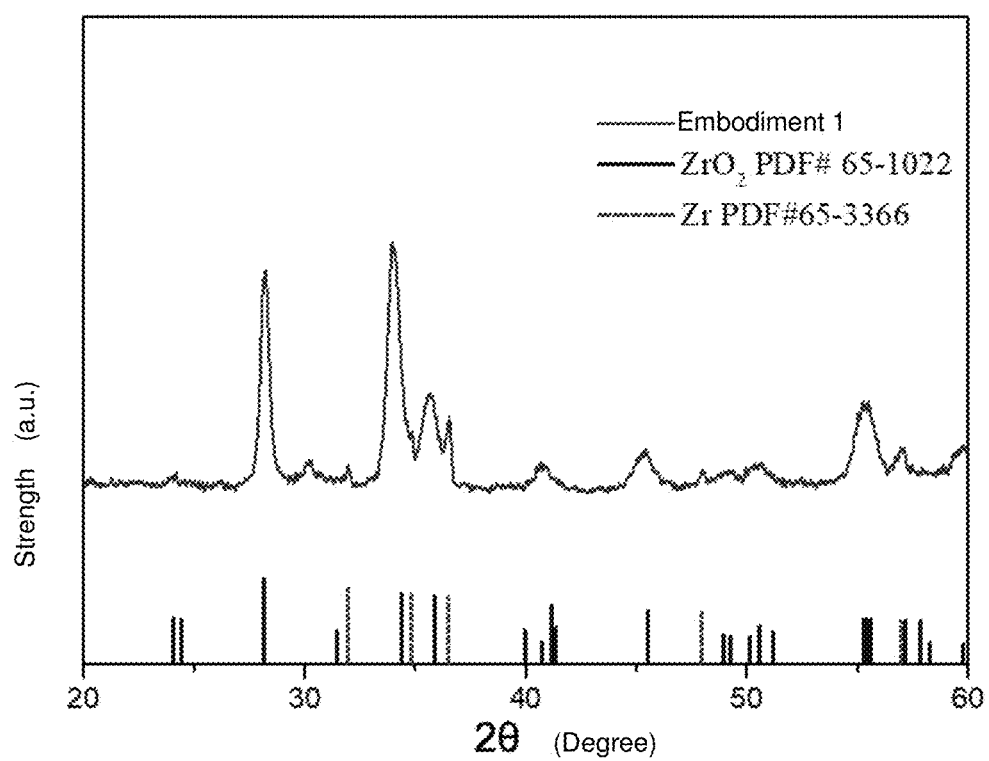
FIG. 18 shows the XRD curve of the oxidation layer surface in Embodiment 1.

XRD (D8DISCOVER, Bruker, Germany) analyzed the oxidation layer of the tibial plateau prosthesis of Embodiment 1 (as shown in FIG. 18). The oxidation layer contained monoclinic phase zirconia and tetragonal phase zirconia.

The microhardness measurement on the tibial plateau prosthesis of Embodiments 1-3 were determined by a microhardness tester (MHVS-1000 PLUS, Shanghai Aolongxingdi Testing Equipment Co., Ltd., China), in which the load was 0.05 kg, the load time of the specimens was 20 s, and 8 points were taken for each specimen. The average hardness values measured in Embodiments 1-3 were 1948.6 Hv, 1923.7 Hv, and 1967.2 Hv, suggesting that the oxidation layer in the tibial plateau prosthesis of the present disclosure has high hardness.

Experiments have proved that the zirconium-niobium alloy powder bonding degree, compressive properties, solid part of the compressive properties, metallographic structure, the crystal structure, thickness and hardness of the oxidation layer for the tibial plateau prosthesis prepared in Embodiments 2 and 3, are similar to that prepared in Embodiment 1.

Figure 19:
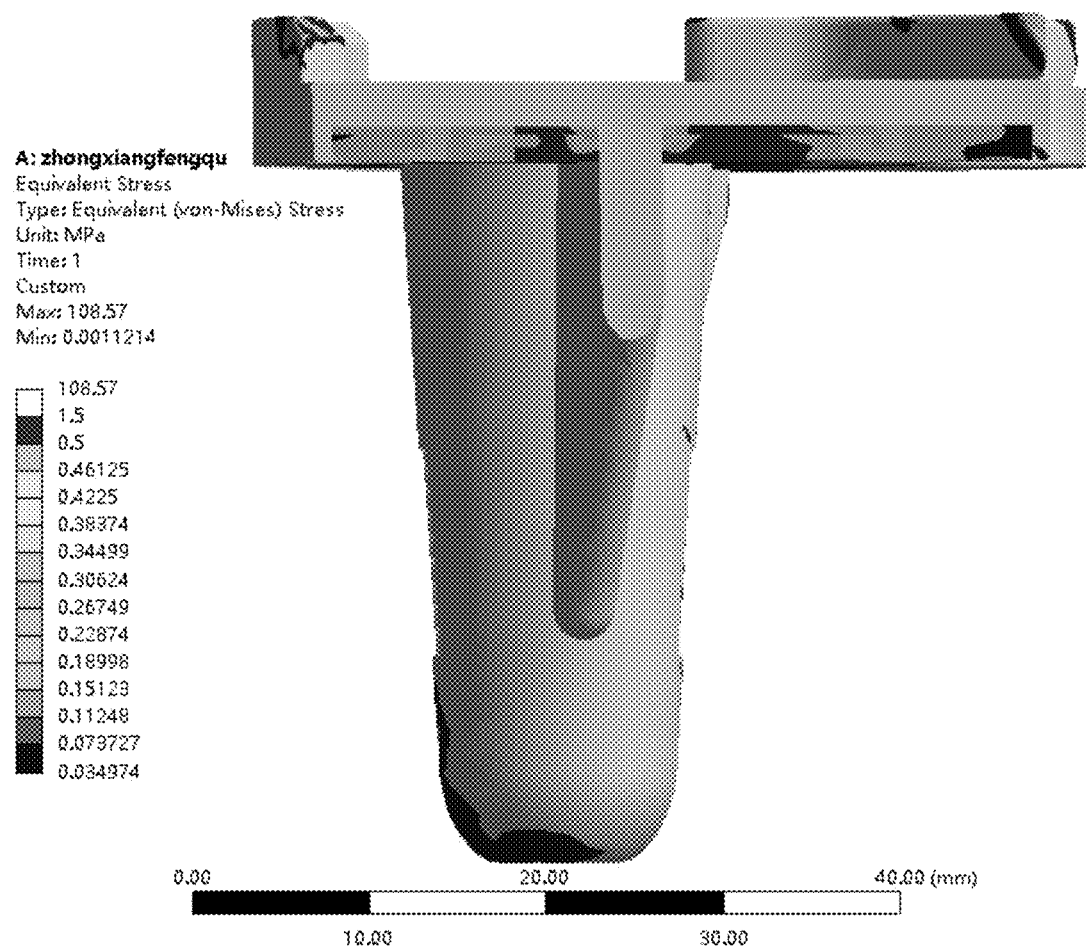
FIG. 19 shows the equivalent stress cloud chart of the tibial plateau prosthesis of the embodiment 1, wherein the handle is the curved cross-shaped stiffened plate, the first section line 13 and the second section line 14 are straight lines and are arranged in parallel arrangement, and included angles 18,19 between the first section line 13/second section line 14 and the transverse diameter 10 are 90°.

The finite element model of Embodiment 1 was analyzed by finite element model. The results are shown in FIG. 19. The stress concentration area at the connection between the trabeculae and the matrix of the tibial plateau prosthesis in Embodiment 1 is small, suggesting that the bonding strength between the trabeculae and the matrix is excellent.

The invention claimed is:

1. A preparation method of the tibial plateau prosthesis with trabeculae containing zirconium-niobium alloy on oxidation layer comprising the following steps:
    1) Using zirconium-niobium alloy powder as a raw material, conducting a 3D printing for one-piece molding, and obtaining a first intermediate of the tibial plateau prosthesis with trabeculae containing zirconium-niobium alloy on oxidation layer, putting the first intermediate into a Sinter-hip furnace, heating to 1250° C.-1400° C. under inert gas protection, placing at a constant pressure of 140 MPa-180 MPa for 1 h to 3 h, reducing to a normal pressure, cooling to below 200° C. with the furnace, taking the first intermediate out, and obtaining a second intermediate of the tibial plateau prosthesis with trabeculae;
    2) Placing the second intermediate product in a programmable thermostat to cool to −80° C. to −120° C. at a rate of 1° C./min, keeping the second intermediate product at a constant temperature for 5 h to 10 h, and taking the second intermediate product out of the programmed thermostat; placing the second intermediate product in a liquid nitrogen for 16 h to 36 h, and adjusting the temperature to a room temperature so as to obtain a third intermediate;
    3) Placing the third intermediate product in a programmable thermostat to cool to −80° C. to −120° C. at a rate of 1° C./min, and placing the third intermediate product at a constant temperature for 5 h to 10 h, taking the third intermediate product out of the programmed thermostat, placing the third intermediate in the liquid nitrogen for 16 h to 36 h and adjusting the temperature to room temperature so as to obtain a fourth intermediate;
    4) Machining, finishing, polishing, cleaning, and drying the fourth intermediate product, and obtaining a fifth intermediate, where the upper surface roughness of the fifth intermediate tibial plateau support is Ra≤0.050 μm;
    5) Putting the fifth intermediate product into a tube furnace, introducing a atmospheric pressure inert gas containing 5% to 15% of oxygen in percentage by mass, heating to 500° C. to 700° C. at 5° C./min to 20° C./min, and cooling to 400° C. to 495° C. at 0.4° C./min to 0.9° C./min, and cooling to be below 200° C. sequentially, taking the fifth intermediate product out to obtain the tibial plateau prosthesis with trabeculae containing zirconium-niobium alloy on oxidation layer;
    the structure of the tibial plateau prosthesis with trabeculae containing zirconium-niobium alloy on oxidation layer is the same as its first intermediate product, second intermediate product, third intermediate product, fourth intermediate product, and fifth intermediate product;
    wherein the inert gas is helium or argon;
    the tibial plateau prosthesis with trabeculae containing zirconium-niobium alloy on oxidation layer includes a kidney-shaped plateau support (1), a Y-shaped protrusion (3) is provided on the upper surface of the inwardly curved portion of the kidney-shaped plateau support (1), a rear groove is (5) provided on the lateral surfaces of the two branches of the Y-shaped protrusion (3), a curved protrusion (2) is provided on the upper surface of the outwardly curved portion of the kidney-shaped plateau support (1) corresponding to the Y-shaped protrusion (3); a front groove (6) is arranged on the inner side of the curved protrusion (2), the middle part of the lower surface of the kidney-shaped plateau support (1) is provided with a handle (4), and a trabeculae (9) is arranged on the lower surface of the kidney-shaped plateau support (1) excepting connecting the handle (4), the trabeculae (9) is composed of a proximal trabecular layer (21) which is closed to the plateau support (1) and a distal trabecular layer (20) which is away from the plateau support (1); the pore size and porosity of the proximal trabecular layer (21) are evenly arranged, and the distal trabecular layer (20) are partitioned into three partitions; the transverse diameter (10) of the corresponding kidney-shaped plateau support (1) is divided into a first section (25), a second section (26) and a third section (27) by a first marking point (11) and a second marking point (12); and the lengths of the first section, the second section and the third section are 25%-38%, 24%-50% and 25%-38% of the transverse diameter of the kidney-shaped plateau support (1), respectively, a first section line (13) passes through the first marking point (11), a second section line (14) passes through the second marking point (12); and the first section line (13) and the second section line (14) are straight lines or arcs, which separate the distal trabecular layer (20) into an inner portion trabeculae (15), an intermediate portion trabeculae (16) and an outer portion trabeculae (17); the pore size and porosity of the trabeculae in the inner portion (15) are sequentially larger than those in the outer portion (17) and the intermediate portion (16).

2. The preparation method according to claim 1, wherein the chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 µm.

3. The preparation method according to claim 1, wherein the specific steps for adjusting the temperature in steps 2) and 3) are: increasing the temperature to −120° C. to −80° C. and keeping the constant temperature for 3 h to 5 h; then increasing the temperature to −40° C. to −20° C. and keeping the constant temperature for 3 h to 5 h; then increasing the temperature to 4° C. to 8° C. and keeping the constant temperature for 1 h to 3 h and then increasing the temperature.

4. The preparation method according to claim 1, wherein the trabeculae of the proximal trabecular layer (21) has a pore size of 0.36 mm to 0.50 mm, a porosity of 55%-65%, a through-hole ratio of 100%, and a thickness of 0.2 mm-1 mm.

5. The preparation method according to claim 1, wherein the first section line (13) and the second section line (14) of the distal trabecular layer (20) are straight lines and are arranged in parallel or in splayed arrangement; an included angle (18) between the first section line (13) and the transverse diameter (10) of the corresponding kidney-shaped plateau support (1) is 100° to 60°, an included angle (19) between the second section line (14) and the transverse diameter (10) of the corresponding kidney-shaped plateau support (1) is 80° to 120°.

6. The preparation method according to claim 1, wherein the pore size of the inner portion trabeculae (15) of the distal trabecular layer (20) ranges from 1.00 mm to 1.10 mm, the porosity ranges from 77.6% to 85%; the pore size of the intermediate portion trabeculae (16) ranges from 0.74 mm to 0.85 mm, the porosity ranges from 70.0% to 74.7%; the pore size of the outer portion trabeculae (17) ranges from 0.86 mm to 0.99 mm, the porosity ranges from 74.8%-77.5%; and a through-hole ratio is 100%, and the thickness of the distal trabecular layer (20) is 0.5 mm to 3 mm.

7. The preparation method according to claim 1, wherein the handle (4) is selected from one of the followings: a reducing pipe connected with a supporting plate, a reducing pipe with a closed bottom connected with a supporting plate, a cross-shaped stiffened plate or a curved cross-shaped stiffened plate.

8. A tibial plateau prosthesis with trabeculae containing zirconium-niobium alloy on oxidation layer prepared by the preparation method according to claim 1.

9. A tibial plateau prosthesis with trabeculae containing zirconium-niobium alloy on oxidation layer prepared by the preparation method according to claim 2.

10. A tibial plateau prosthesis with trabeculae containing zirconium-niobium alloy on oxidation layer prepared by the preparation method according to claim 3.

11. A tibial plateau prosthesis with trabeculae containing zirconium-niobium alloy on oxidation layer prepared by the preparation method according to claim 4.

12. A tibial plateau prosthesis with trabeculae containing zirconium-niobium alloy on oxidation layer prepared by the preparation method according to claim 5.

13. A tibial plateau prosthesis with trabeculae containing zirconium-niobium alloy on oxidation layer prepared by the preparation method according to claim 6.

14. A tibial plateau prosthesis with trabeculae containing zirconium-niobium alloy on oxidation layer prepared by the preparation method according to claim 7.

* * * * *